United States Patent
Czarnecki et al.

[11] Patent Number: 5,197,581
[45] Date of Patent: Mar. 30, 1993

[54] CREEPER GEAR INTERLOCK FOR TRACTORS

[75] Inventors: John A. Czarnecki, Cornwall, Pa.; Garry L. Ball, Middlesex, England

[73] Assignee: Ford New Holland, Inc., New Holland, Pa.

[21] Appl. No.: 907,343

[22] Filed: Jul. 1, 1992

[51] Int. Cl.⁵ .................. B60K 41/28; B60K 41/08
[52] U.S. Cl. .................. 192/0.062; 74/860; 74/872; 180/271
[58] Field of Search .......... 192/0.062; 74/872, 859, 74/860, 878, DIG. 11; 180/271

[56] References Cited

U.S. PATENT DOCUMENTS

| | | | |
|---|---|---|---|
| 1,853,950 | 4/1932 | Wing | 74/872 X |
| 4,371,051 | 2/1983 | Achterholt | 74/872 X |
| 4,686,869 | 8/1987 | Beim | 74/745 |
| 4,706,519 | 11/1987 | Beim | 74/745 |

Primary Examiner—Rodney H. Bonck
Attorney, Agent, or Firm—Larry W. Miller; Frank A. Seemar

[57] ABSTRACT

An interlock mechanism for a tractor transmission having a creeper gear arrangement is disclosed wherein the operation of the tractor engine is halted whenever the creeper arrangement is left in a condition conducive to incurring unwanted creep. The interlock mechanism is in the form of an electrical circuit operably connected to the fuel shutoff valve to halt the flow of fuel to the tractor engine whenever the creeper arrangement is left in a neutral state with the clutch engaged. The interlock mechanism provides electrical power to the fuel shutoff valve under normal operating conditions. Switches associated with the operative components of the transmission control the flow of electrical current through the interlock circuit.

12 Claims, 2 Drawing Sheets

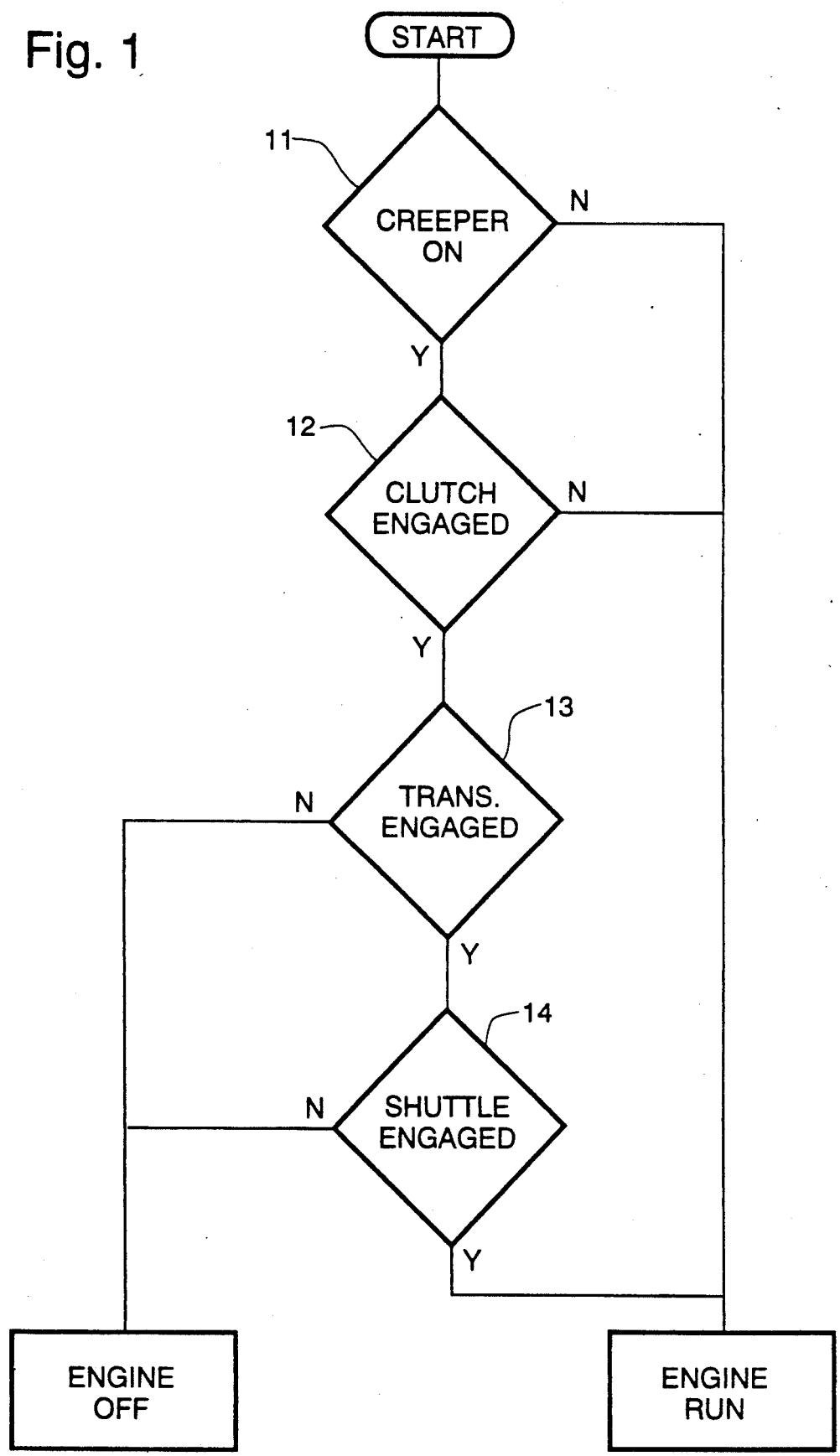

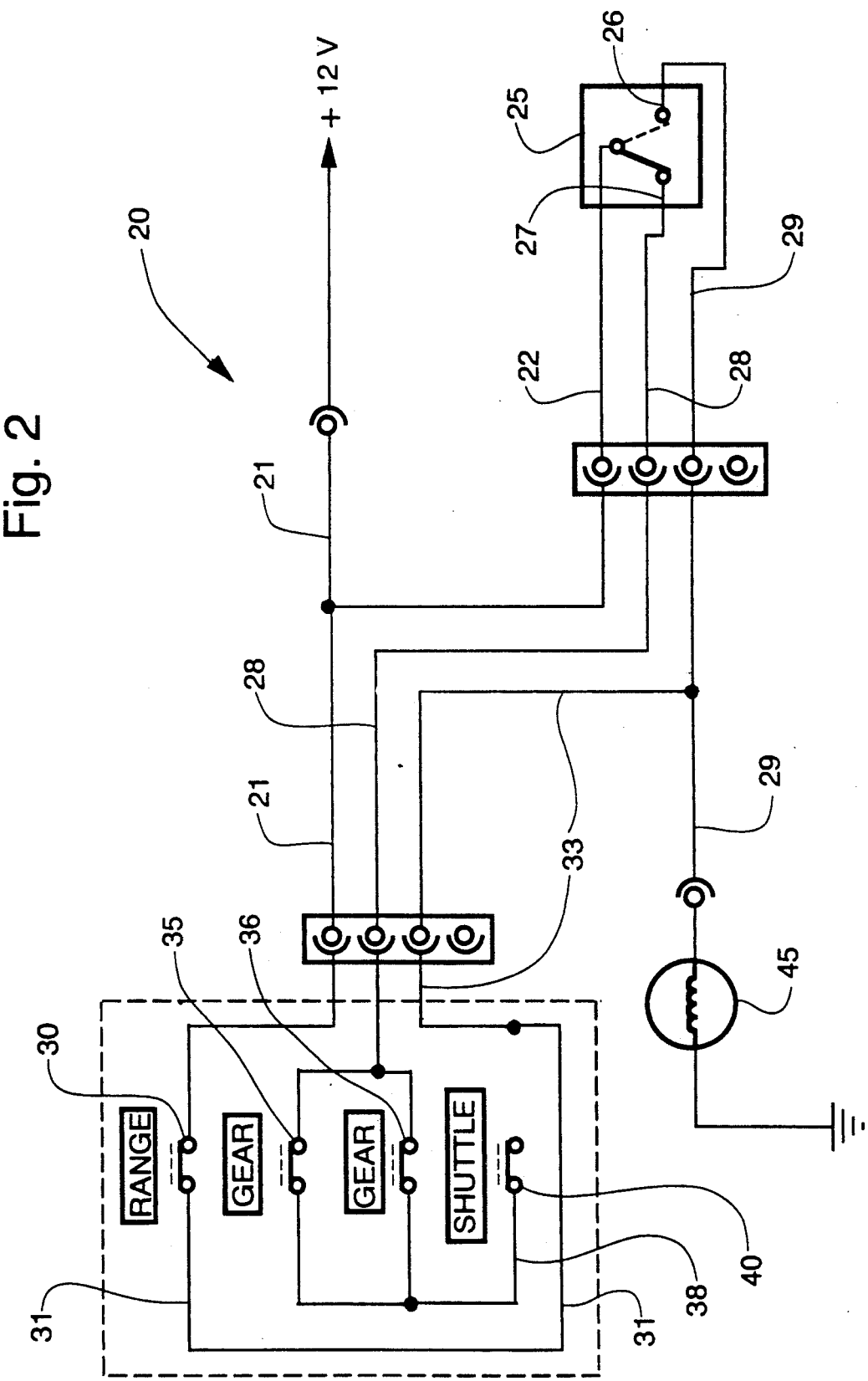

CREEPER GEAR INTERLOCK FOR TRACTORS

BACKGROUND OF THE INVENTION

This invention relates generally to off-road motor vehicles, such as tractors, and more particularly, to an interlock mechanism cooperable with a creeper gear to control engagement thereof under specified conditions.

Contemporary tractor transmissions have become mechanically complicated, incorporating sixteen or more forward speeds and usually half as many speeds in reverse, along with hydraulic, electric or electronically controlled shifting mechanisms to change the selected speed of operation of the tractor. The various operations for which tractors are employed require such a wide range of options and speeds of operation. Some specialized harvesting operations, among others, require very slow speeds of operation, which are typically provided through a "creeper gear" or range of gears.

Creeper options for tractors introduce design challenges. When in "creeper gear", the tractor is usually capable of a very slow speed of movement over the ground with the ability to pull with several thousands of pounds of force. In some tractor transmissions, internal drag between the gears and the oil bath for the gears can transmit this pulling force from the engine to the output shaft of the transmission even though the transmission gears are not engaged. i.e. the transmission is in neutral, resulting in unwanted creep of the tractor.

It is desirable to provide a tractor transmission having a crooper gear arrangement in which the unwanted creep, occurring when the transmission is in a neutral state through drag within the transmission, is prevented by an interlock mechanism associated with the tractor engine.

SUMMARY OF THE INVENTION

It is an object of this invention to provide an interlock mechanism cooperable with a tractor transmission having a creeper gear apparatus to prevent operation of the transmission whenever the transmission is in a condition conducive to effecting unwanted creep.

It is a feature of this invention that the interlock mechanism will be operable to shut off the fuel supply to the tractor engine under conditions conducive to incurring unwanted creep of the tractor.

It is an advantage of this invention that the interlock mechanism is in the form of an electrical circuit controlling power to a fuel shutoff solenoid for the tractor engine.

It is another feature of this invention that the interlock circuit allows the operator to continue normal operation of the tractor under all conditions except when the clutch is engaged and the transmission is left in neutral.

It is another object of this invention to stop operation of the tractor engine whenever the tractor transmission is left in a condition conducive to incurring unwanted creep.

It is another advantage of this invention that the interlock mechanism is operable to stop operation of the tractor engine whenever the creeper apparatus of the transmission is left in neutral.

It is still another object of this invention to provide an interlock mechanism cooperable with a creeper gear arrangement in a tractor transmission which is durable in construction, inexpensive of manufacture, carefree of maintenance, facile in assemblage, and simple and effective in use.

These and other objects, features and advantages are accomplished according to the instant invention by providing an interlock mechanism for a tractor transmission having a creeper gear arrangement to halt operation of the tractor engine whenever the creeper arrangement is left in a condition conducive to incurring unwanted creep. The interlock mechanism is in the form of an electrical circuit operably connected to the fuel shutoff valve to halt the flow of fuel to the tractor engine whenever the creeper arrangement is left in a neutral state with the clutch engaged. The interlock mechanism provides electrical power to the fuel shutoff valve under normal operating conditions. Switches associated with the operative components of the transmission control the flow of electrical current through the interlock circuit.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a logic diagram reflecting the interlock mechanism incorporating the principles of this instant invention, the interlock mechanism being associated with the operation of the creeper apparatus for a tractor transmission; and FIG. 2 is a schematic diagram of a wiring harness incorporating an electrical circuit forming the interlock mechanism for the instant invention.

DETAILED DESCRIPTION OF THE PREFERRED EMBODIMENT

Referring now to FIGS. 1 and 2, a creeper transmission interlock for tractors, incorporating the principles of the instant invention, can best be seen. For a general background on the operation and structure of a typical tractor transmission, reference is made to U.S. Pat. No. 4,686,869, issued Aug. 18, 1987, and entitled "Ratio Change Gear Speed Synchronizing in a Tractor Transmission", the description of which is incorporated herein by reference. Such tractor transmissions can be equipped with a supplemental "creeper" gear assembly to provide extremely slow speeds of operation for the tractor. A representative such creeper transmission can be found in U.S. Pat. No. 4,706,519, issued on Nov. 17, 1987, entitled "Creeper Speed Actuator for a Tractor Transmission", the descriptive portions of which are incorporated herein by reference.

Creeper gear transmissions provide an extremely slow speed of operation of the tractor which is capable of pulling a considerable amount of force at such slow speeds due to the mechanical advantages associated with the transmissions. When the creeper transmission is placed in a neutral condition with the tractor engine continuing to run, frictional drag between the oil within the transmission and the disengaged gears can result in a propulsion of the tractor at a very slow speed, but with a considerable amount of pulling or pushing power, even though the transmission gears are not engaged. This unwanted "creep" has been known to push down the side of a building. Accordingly, an interlock between engagement of the creeper transmission and the operation of the tractor is desirable, provided that the interlock does not interfere with the normal operation of the tractor.

A tractor transmission will have a range shifter lever that will be used to switch the transmission between the creeper range of speeds and at least one other range of speeds, though the transmission will likely be provided with two speed ranges in addition to the creeper range. Therefore, whenever the operator desires to engage the creeper transmission, the range lever is shifted into the "creeper range". The transmission itself will have a plurality of shiftable gears that can be intermeshed in selected arrangements to provide a plurality of operational speeds within each selected range of speeds. Some tractor transmissions are provided with shift rails to accomplish the shifting of gears into the selected arrangement. Whenever the transmission is placed in an arrangement where no gears are intermeshed, the transmission is placed in "neutral". The tractor is provided with a clutch pedal operatively engaged with the transmission to permit the gears to be shifted from one arrangement to another. This clutch pedal is manually moved by the operator when a new gear arrangement is desired between a depressed position in which the transmission is disengaged from the tractor engine and an engaged position in which the transmission is actively coupled to the output shaft of the tractor engine. Tractors are also provide with a shuttle control which typically switches the forward and reverse operation of the transmission. The shuttle control is normally provided with a neutral position between the forward and reverse positions. Normally the operator is required to depress the clutch pedal to be able to effect a movement of the shuttle control from position to position.

The logic diagram depicted in FIG. 1 reflects the operation of the creeper interlock mechanism. Whenever the range lever is not in the "creeper range", as determined by the test 11, the engine is permitted to continue running without impedance from the creeper interlock mechanism. The second test 12 is incurred if the range lever is in the creeper range and determines whether the clutch is engaged for operatively connecting the engine to the transmission for power transfer therebetween. If the clutch is disengaged, no power can be transferred to the transmission to effect unwanted creep; therefore, the engine is permitted to continue to run. If the clutch is engaged, further testing is undertaken.

Since the unwanted creep is incurred under conditions where the transmission is in a neutral state, either by the disengagement of all gears within the transmission or by the shuttle control being in the neutral position while the engine is operatively engaged with the transmission, the subsequent tests 13, 14 determine whether either of these conditions exist. If the transmission is in a neutral position, the engine is shut down. If any gears are engaged within the transmission, the next test determines the state of the shuttle control, which if in a neutral state results in a shut down of the engine. Otherwise, the engine is permitted to run.

This logic permits the existence of a creeper interlock that does not interfere with the normal operation of the tractor, whether in the creeper range or not. Even if the tractor has the creeper range engaged, a shifting of the transmission from one gear arrangement to another, including the shifting of the shuttle control between forward and reverse, both of which temporarily place the transmission in a neutral condition, the clutch is disengaged to allow the engine to continue running without testing for the neutral condition of the transmission. Therefore, normal creeper operation of the tractor is unaffected by the creeper interlock and non-creeper operations of the tractor are also unaffected.

Referring now to FIG. 2, a wiring diagram for an electrical circuit 20 incorporating the logic of the creeper interlock depicted in FIG. 1 can best be seen The circuit 20 receives standard electrical current from the tractor battery through line 21 which feeds electrical current to transmission switches as described in greater detail below. Line 22 is spliced into line 21 to direct electrical current to a clutch switch 25 associated with the position of the conventional clutch pedal (not shown). If the clutch pedal is depressed, resulting in the disengagement of the clutch interconnecting the engine and the transmission, the clutch switch 25 electrically connects switch pole 26 to route electrical current through line 29. If the clutch pedal is not depressed, resulting in the clutch being engaged to transfer operative power from the engine to the transmission, the clutch switch 25 electrically connects switch pole 27 to route electrical current through line 28, rather than line 29.

The transmission houses switches corresponding to the shift devices relating to the state of the transmission. The range switch 30 is operatively associated with the range lever (not shown) in such a manner that the switch is normally closed, as shown in solid lines, to route electrical current through line 31 and ultimately through line 33 which is spliced to line 29, unless the range lever is placed into the creeper range position, thereby placing the transmission into the creeper gear arrangements, whereupon the range switch 30 is moved into the open position shown in broken lines to prevent electrical current from flowing through line 31.

Electrical current flowing through line 28 from the clutch switch 25, due to the clutch being engaged, is directed to a plurality of gear switches 35, 36 arranged in parallel. In FIG. 2, two parallel gear switches 35, 36 are depicted as being representative of two shifting devices, such as shift rails (not shown), controlling the engagement of gears within the transmission. If any of the shift devices are arranged to effect gear engagement, the corresponding gear switch 35, 36 is closed, as shown in solid lines, allowing electrical current to flow through that closed switch 35, 36 to line 38 to the shuttle switch 40. For example, if the shifting device associated with gear switch 35 is oriented to disengage all gears associated with that shifting device, but the shifting device associated with gear switch 36 has two selected gears intermeshed for power transfer therebetween, the gear switch 35 will be open, as shown in the broken lines, but the gear switch 36 will be closed to allow electrical current to be routed to line 38.

Assuming engagement of the clutch and selected gears within the transmission, electrical current flows into line 38 to the shuttle switch 40. If the shuttle control (not shown) is in a non-neutral position, i.e. either forward or reverse, the shuttle switch 40 is in the closed position, as shown in solid lines, to direct the flow of electrical current into line 33. The placement of the shuttle control in a neutral position effects an opening of the shuttle switch 40 to prevent electrical current from reaching line 33.

Line 29 is connected to a grounded fuel shutoff solenoid 45 which controls the flow of fuel to the tractor engine (not shown). The solenoid 45 is arranged such that the disruption of electrical power thereto results in the stoppage of fuel to the engine (not shown), thereby stopping the engine from running. As can be seen from the description of the electrical circuit 20 above, electrical current is fed directly to the solenoid 45 to maintain a flow of fuel to the engine through lines 21, 31, 33 and 29 whenever the range lever is in a "noncreeper" position, irrespective of the condition of the gear switches 35, 36, shuttle switch 40, or clutch switch 25. Therefore, the creeper interlock cannot effect the normal operation of the tractor when it is not utilizing the creeper transmission.

Assuming then that the creeper range has been selected and the range switch 30 is opened, electrical current must reach line 29 other than through line 31. As noted above, if both the transmission is engaged, i.e. two selected gears within the transmission have been operatively intermeshed, and the shuttle control is engaged to control the forward or reverse direction of the tractor, one of the gear switches 35, 36 and the shuttle switch 40 are closed to allow electrical current to flow from line 28 through lines 38 and 33 to line 29. Under these particular conditions, the existence of electrical current in line 28 or line 29, depending on the state of the clutch switch 25 is irrelevant as current is routed to line 29 in either case.

If either the transmission or the shuttle control are in a neutral state with the creeper range selected, either the corresponding gear switches 35, 36 will all be open or the shuttle switch 40 will be open to halt the flow of current into line 33. Under these conditions, electrical current can only reach the fuel shut off solenoid 45 through line 29 from the clutch switch pole 26, corresponding to the depressing of the clutch pedal, indicating the presence of the operator. In situations where the operator is shifting either the transmission or the shuttle control and passes through a corresponding neutral state, the creeper interlock will prevent the flow of electrical current into line 33, but the operator will have the clutch disengaged to effect such a shift, resulting in the clutch switch 25 directing electrical current through switch pole 26 to the solenoid 45 through line 29 to keep the engine running. Initial start-up of the engine can also be effected, even though the creeper range has been selected and either the transmission or shuttle control, or both, are in neutral, by depressing the clutch pedal to direct electrical current to the solenoid 45.

It will be appreciated by those skilled in the art that this interlock mechanism may be employed in tractors having electric or electronic transmission controls, even those transmissions not utilizing a mechanically actuated clutch or actuating levers, by sensing the positions of solenoids, valve spools or other shifting devices in a similar manner to that described above.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. An interlock mechanism operably interconnecting a tractor engine and a transmission having a creeper range connected thereto, said transmission having a plurality of gears selectively cooperable in an intermeshed condition to provide a corresponding plurality of speeds of operation, a range control for selectively engaging said creeper range and a shuttle control for controlling the forward and reverse direction of operation of the transmission, said gears being positionable in a neutral state in which none of said gears are intermeshed, said shuttle control also being provided with a neutral state in which neither said forward or reverse direction of operation is selected, a clutch being operably interposed between said tractor engine and said transmission for selectively coupling therebetween, said clutch being positionable in a disengaged state in which operative power is prevented from being transmitted to said transmission, comprising:

range sensor means operably associated with said range control to sense the selection of the creeper range;

transmission sensor means for sensing the neutral state of said transmission;

shuttle sensor means for sensing the neutral state of said shuttle control;

clutch sensor means for sensing the disengaged state of said clutch;

engine control means for controlling the operation of said tractor engine; and connecting means interconnecting each of said sensor means and said engine control means to stop the operation of said engine under conditions where said creeper range has been selected and at least one of said transmission sensor means and said shuttle sensor means senses a corresponding neutral state.

2. The interlock mechanism of claim 1 wherein said connecting means allows said tractor engine to continue to run irrespective of the sensed corresponding neutral state by at least one of said transmission sensor means and said shuttle sensor means whenever said clutch sensor means senses the disengaged state of said clutch.

3. The interlock mechanism of claim 2 wherein said transmission sensor means and said shuttle sensor means are connected in series, said range sensor means being connected in parallel with said transmission and shuttle sensor means.

4. The interlock mechanism of claim 3 wherein said transmission sensor means includes a plurality of gear sensors corresponding to shiftable devices within said transmission, all of said gear sensors being connected in parallel.

5. The interlock mechanism of claim 4 wherein said engine control means includes a fuel shutoff solenoid controlling the conveyance of fuel to said engine.

6. A method of controlling the operation of an engine mounted on a vehicle having a transmission operable connected to said engine to receive operational power therefrom, said transmission having a creeper range engageable through manipulation of a range control movable for selection of a creeper range and a noncreeper range, a plurality of gears selectively cooperable in an intermeshed condition to provide a corresponding plurality of speeds of operation, and a shuttle control for controlling the forward and reverse direction of operation of the transmission, said gears being positionable in a neutral state in which none of said gears are intermeshed, said shuttle control also being positionable in a neutral state in which neither said forward or reverse direction of operation is selected, a clutch being operably interposed between said tractor engine and said transmission for selectively coupling therebetween, said clutch being positionable in a disengaged state in which operative power is prevented from being transmitted to said transmission, comprising:
- sensing the selection of said creeper range;
- then, sensing the neutral state of said transmission and said shuttle control; and
- then, stopping the operation of said engine upon the selection of said creeper range and the existence of a neutral state in one of said transmission and said shuttle control.

7. The method of claim 6 further comprising the steps of:
- sensing the disengaged state of said clutch; and
- overriding said stopping step to permit said engine to continuing running upon the existence of said disengaged state of said clutch irrespective of the neutral state of said transmission and said shuttle control.

8. The method of claim 7 wherein said stopping step includes the step of:
- de-energizing a fuel shutoff solenoid to halt the flow of fuel to said engine.

9. In a tractor having a frame; an engine supported on said frame; a transmission supported on said frame and being operably coupled to said engine by a clutch to transmit operative power from said engine to said transmission, said clutch being movable to a disengaged position in which said transmission cannot receive operational power from said engine, said transmission having a plurality of gears selectively cooperable with shifting devices operable to move selected gears into an intermeshed condition to provide a corresponding plurality of speeds of operation, a creeper mechanism operable associated with said transmission to provide a creeper range of speeds, a range lever for selectively engaging said creeper range, and a shuttle control for controlling the forward and reverse direction of operation of the transmission, said gears being positionable in a neutral state in which none of said gears are intermeshed, said shuttle control also being provided with a neutral state in which neither said forward or reverse direction of operation is selected, an interlock mechanism operatively interconnecting said engine and said transmission comprising:
- a range switch operably associated with said range lever to sense the selection of the creeper range;
- a transmission switch associated with each said shifting device to sense the neutral state of said transmission;
- a shuttle switch for sensing the neutral state of said shuttle control;
- a clutch switch for sensing the disengaged state of said clutch;
- a fuel shutoff solenoid operatively associated with said engine to control the flow of fuel to said engine, said fuel shutoff solenoid stopping the flow of fuel to said engine whenever said fuel shutoff solenoid is de-energized; and
- electrical wiring connected to a source of electrical current and interconnecting each of said switches and said fuel shutoff solenoid to control the energizing of said solenoid in response to the position of said switches.

10. The tractor of claim 9 wherein said fuel shutoff solenoid is de-energized to stop the operation of said engine under conditions where said creeper range has been selected and at least one of said transmission and said shuttle control is in a neutral state.

11. The tractor of claim 10 wherein said fuel shutoff solenoid is maintained in an energized state whenever said clutch is disengaged irrespective of the neutral state of said transmission and said shuttle control.

12. The tractor of claim 11 wherein said fuel shutoff solenoid is maintained in an energized state whenever said transmission is in a non-creeper range, irrespective of the neutral state of said transmission and said shuttle control.

* * * * *